(12) United States Patent
Girard et al.

(10) Patent No.: US 6,727,464 B2
(45) Date of Patent: Apr. 27, 2004

(54) METHOD OF MANUFACTURING A MOTOR VEHICLE ANTIVIBRATION DEVICE COMPRISING A METAL INSERT FOR BONDING TO ELASTOMER

(75) Inventors: André Girard, Mehon sur Yevre (FR); Victor Zarife, Cepoy (FR)

(73) Assignee: Hutchinson, Paris (FR)

( * ) Notice: Subject to any disclaimer, the term of this patent is extended or adjusted under 35 U.S.C. 154(b) by 12 days.

(21) Appl. No.: 10/253,556

(22) Filed: Sep. 24, 2002

(65) Prior Publication Data
US 2003/0071022 A1 Apr. 17, 2003

(30) Foreign Application Priority Data
Sep. 28, 2001 (FR) ............................................. 01 12518

(51) Int. Cl.[7] ............................................. B23K 26/00
(52) U.S. Cl. .................................................. 219/121.85
(58) Field of Search ...................... 219/121.85, 121.69, 219/121.61, 121.8, 121.67, 121.68, 121.78, 121.79, 121.81; 427/554

(56) References Cited

U.S. PATENT DOCUMENTS

| 4,720,621 A | 1/1988 | Langen | |
| 4,740,982 A | * 4/1988 | Hakuta et al. | 372/59 |
| 4,803,021 A | 2/1989 | Werth et al. | |
| 4,861,407 A | 8/1989 | Volkmann et al. | |
| 4,931,125 A | 6/1990 | Volkmann et al. | |
| 4,968,383 A | 11/1990 | Volkmann et al. | |
| 5,482,406 A | 1/1996 | Arlt, III | |
| 5,641,248 A | 6/1997 | Arlt, III | |
| 5,965,042 A | * 10/1999 | Saitoh | 219/121.68 |

FOREIGN PATENT DOCUMENTS

JP 2001-9399 * 1/2001

OTHER PUBLICATIONS

International Search Report: French Search Report FR 01 12518 issued Jul. 12, 2002.

* cited by examiner

*Primary Examiner*—Tom Dunn
*Assistant Examiner*—Jonathan Johnson
(74) *Attorney, Agent, or Firm*—Marshall, Gerstein & Borun LLP

(57) ABSTRACT

A method of manufacturing an antivibration device for motor vehicles, the device comprising at least one metal insert having at least one fixing surface bonded to an elastomer, the method including a cleaning step during which the fixing surface is scanned with a laser beam that is sufficiently powerful to eliminate the impurities present on said surface.

13 Claims, 2 Drawing Sheets

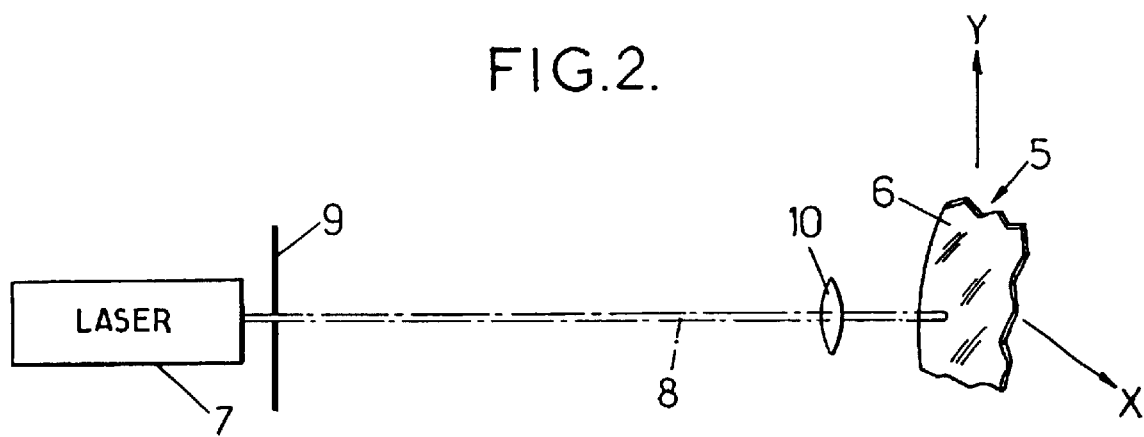
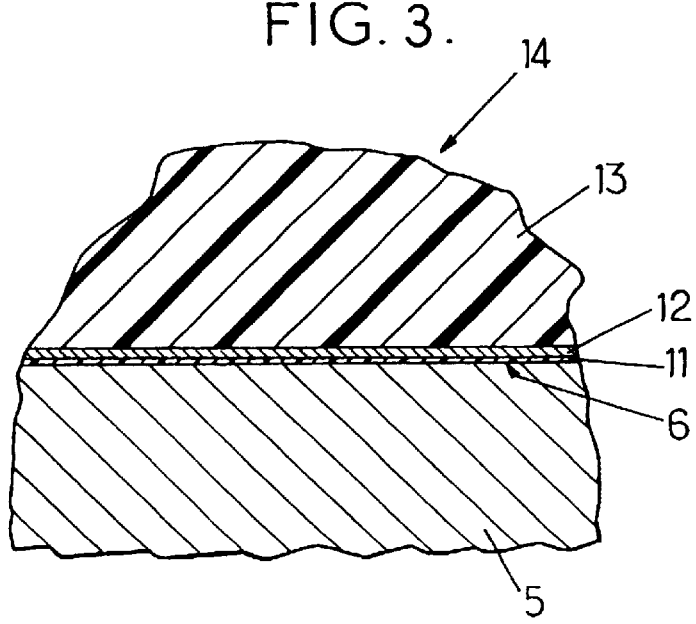

METHOD OF MANUFACTURING A MOTOR VEHICLE ANTIVIBRATION DEVICE COMPRISING A METAL INSERT FOR BONDING TO ELASTOMER

FIELD OF THE INVENTION

The present invention relates to methods of manufacturing an antivibration device for motor vehicles, the device comprising at least one metal insert for bonding to an elastomer.

The term "metal insert" is used herein to mean any piece made of metal for bonding to elastomer, and regardless of whether or not the piece is for embedding in the elastomer.

More particularly, the invention relates to a method of manufacturing an antivibration device for motor vehicles, the device comprising at least one metal insert itself having at least one fixing surface bonded to an elastomer (e.g. rubber), the method comprising the following steps:

a step of cleaning the fixing surface;

a coating step during which the fixing surface is covered in at least one layer of fixing material for making a bond between the insert and the elastomer, said material being based on rubber; and a step of molding the elastomer onto the insert.

During the coating step it can be deposited in particular:

an activatable primary adhesive which is subsequently covered in a layer of secondary adhesive, which secondary adhesive subsequently reacts with the elastomer while the elastomer is being vulcanized; or directly an adhesive which reacts on its own with the elastomer during vulcanization thereof (in which case it is constituted by the adhesive referred to as "secondary" in the paragraph above).

BACKGROUND OF THE INVENTION

In known methods of this type, the cleaning step consists in particular of dipping the metal insert in successive degreasing baths which require bulky and expensive infrastructure and which contain substances that are dangerous and polluting.

OBJECTS AND SUMMARY OF THE INVENTION

A particular object of the present invention is to mitigate those drawbacks.

For this purpose, according to the invention, in a method of the kind in question, the cleaning step is performed dry and comprises laser treatment which consists in scanning the fixing surface with a laser beam of sufficient power to eliminate the impurities present on said fixing surface.

By means of these provisions, there is no need to use degreasing baths for cleaning the surface of the insert, thereby simplifying the method of treatment, and making it less expensive and less dangerous for the environment. In addition, it is found that laser treatment also facilitates subsequent bonding of the insert with the elastomer. The fact that the fixing material is based on rubber also facilitates bonding with the elastomer.

In different implementations of the invention, use may also be made of one or more of the following provisions:

during the cleaning step, the laser beam delivers energy to the fixing surface at a mean density per unit area lying in the range 0.5 Joules per square centimeter ($J/cm^2$) to 20 $J/cm^2$;

a pulse laser is used;

the fixing surface is scanned by the laser beam at a treatment speed of at least 2 square centimeters per second ($cm^2/s$);

a laser is used selected from excimer lasers emitting in the ultraviolet and yttrium aluminum garnet (YAG) lasers emitting in the infrared;

the insert is made of steel;

during the cleaning step the laser beam is used to deliver sufficient energy to the fixing surface of the metal insert to eliminate all traces of corrosion on said fixing surface;

the cleaning step is followed by a passivation step;

the cleaning step is followed directly by the coating step;

the coating step is implemented sufficiently quickly after the cleaning step to avoid any trace of corrosion reappearing on the fixing surface;

the coating step is implemented less than 24 hours after the end of the cleaning step;

during the cleaning step the laser beam is used to deliver sufficient energy to the fixing surface to etch said fixing surface to a small extent: in any event, this facilitates subsequent adhesion between the insert and the elastomer; in addition, this avoids a subsequent shot blasting step of the kind normally performed between the cleaning step and a step of applying anticorrosion protection; and the elastomer is rubber.

BRIEF DESCRIPTION OF THE DRAWINGS

Other characteristics and advantages of the invention appear from the following description of an implementation, given by way of non-limiting example and made with reference to the accompanying drawings.

In the drawings:

FIG. 2 is a diagrammatic view of an example of an installation for performing a method constituting an implementation of the invention; and FIG. 3 is a section view through a portion of a part made using the method of the invention, and shown prior to vulcanization.

MORE DETAILED DESCRIPTION

Figure 1:
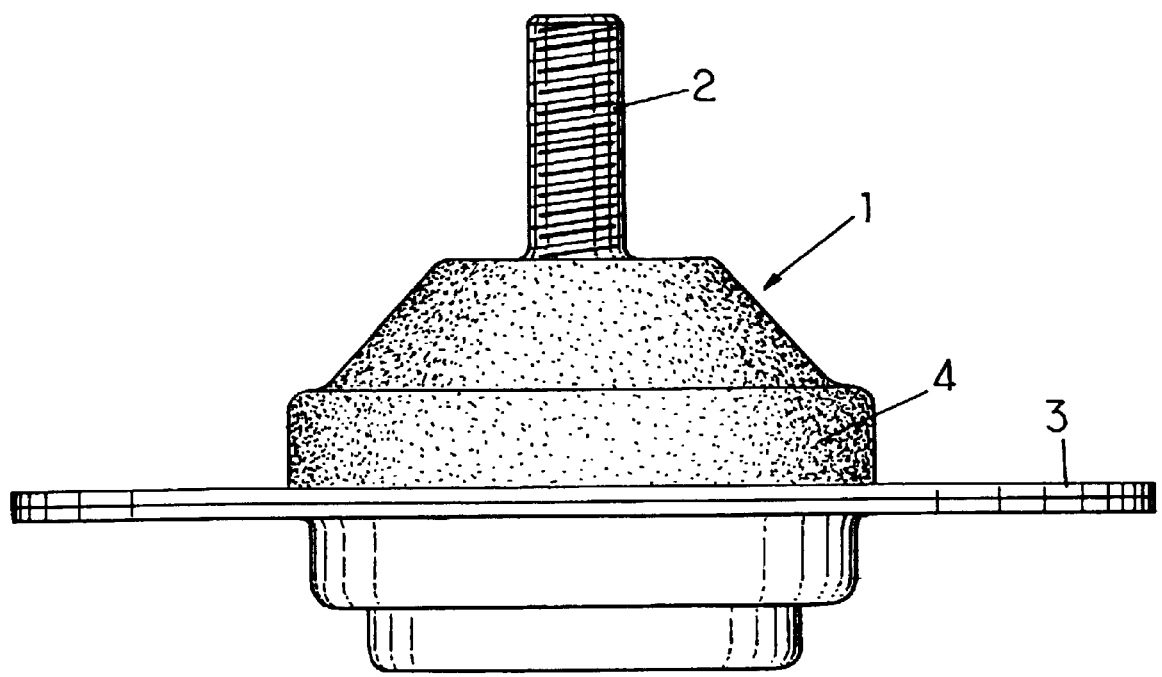
FIG. 1 is a diagrammatic side view of an antivibration support made using the method of the invention.

In the various figures, the same references are used to identify elements that are identical or similar.

FIG. 1 shows an antivibration support 1 made using the method of the invention. The support comprises:

a metal pin 2 secured to a rigid metal base;

a rigid metal ring 3; and an elastomer body 4 connecting the base of the pin 2 in leaktight manner to the ring 3, the elastomer being bonded to both pieces.

The base of the pin 2 and the ring 3 both constitute respective "metal inserts" 5 in the meaning of the invention. By way of example, the metal insert 5 is made of steel. The insert has a fixing surface 6 for bonding to the mass of elastomer constituting the body 4.

As shown in FIG. 2, prior to bonding, the fixing surface 6 is subjected to preliminary laser cleaning treatment, e.g. using a pulse laser 7 emitting a laser beam 8 which reaches the fixing surface 6 for cleaning by passing through a mask 9 and one or more lenses 10, for example.

By way of non-limiting example, it is possible to use an excimer laser emitting in the ultraviolet, and in particular a XeCl pulse laser emitting at a wavelength of 308 nanometers (nm) operating at a repetition frequency of 250 hertz (Hz), and supplying 350 millijoules (mJ) of energy per pulse, the laser beam forming, for example, a light spot having an area lying in the range 5 square millimeters (mm$^2$) to 6 mm$^2$ on the fixing surface 6.

In a variant, it is possible in like manner to use a YAG pulse laser emitting in the infrared.

In order to clean the fixing surface 6, relative movement is established between the beam 8 and the insert 5 in two directions X and Y perpendicular to the laser beam 8 so that the beam scans the entire fixing surface 6. Naturally, such relative movement can be obtained equally well by moving the insert 5 or by moving the laser beam 8. The speed of treatment applied to the fixing surface 6 can be greater than 2 cm$^2$/s, for example it can be about 4 cm$^2$/s.

The laser beam 8 can be used to deliver mean energy density per unit area on the fixing surface 6 lying in the range 0.5 J/cm$^2$ to 20 J/cm$^2$, for example densities lying in the range 2 J/cm$^2$ to 15 J/cm$^2$, and in particular lying in the range 5 J/cm$^2$ to 10 J/cm$^2$.

The mean energy density delivered to the fixing surface 6 by the laser beam 8 is sufficient:

- to eliminate the impurities present on the fixing surface 6 (in particular oil and grease);
- to eliminate all traces of corrosion on said fixing surface 6, thus making it possible to avoid any subsequent anticorrosion treatment; and
- to etch the fixing surface 6 to a small extent, thus making it possible to avoid any subsequent shot blasting treatment or the like.

The cleaning of the fixing surface 6 by means of a laser can be followed quickly (i.e. without any anticorrosion treatment), e.g. within 24 hours when the insert 5 is exposed to ambient air, by a coating step during which the fixing surface 6 is covered in at least one layer of fixing material for making a bond between the insert and the elastomer.

Optionally, passivation treatment can be performed on the insert 5, e.g. by dipping it in a passivating bath of known type, such as that sold under the trademark "PARCOLENE 1" or under the trademark "GARDOLENE D6870" by CHEMETAL of Clichy, France (products manufactured by PARKER in the USA).

As shown in FIG. 3, in the example under consideration, this coating step can consist in providing the fixing surface 6 with a primary layer of activatable adhesive based on rubber.

By way of non-limiting example, this primary layer can be made using the product sold under the trademark "THIXON P11 DV1" by MORTON of Semoy, France.

Once it has been coated in the primary layer 11, the fixing surface 6 is protected against corrosion so that the insert 5 can be stored without deteriorating until final bonding with the elastomer: for final bonding, the primary layer 11 is covered in a secondary layer 12 of adhesive that is also based on rubber (e.g. made using the product sold under the trademark "THIXON 520" by MORTON of Semoy, France), after which raw rubber 13 or some other elastomer is overmolded onto the secondary layer 12 prior to heating the assembly for vulcanizing purposes. It should be observed that the secondary layer 12 of adhesive could equally well be deposited immediately after depositing the primary layer.

The resulting piece of elastomer 14 presents excellent strength and in particular excellent ability to withstand peeling apart at the interface between the elastomer 13 and the insert 5, and this has been confirmed by tests performed both in the new state and after aging in boiling water or in a saline mist.

It should be observed that the invention is also applicable to inserts made of metals other than steel, for example inserts made of light alloy.

What is claimed is:

1. A method of manufacturing an antivibration device for motor vehicles, the device comprising at least one metal insert itself having at least one fixing surface bonded to an elastomer, the method comprising the following steps:

cleaning the fixing surface;

coating the fixing surface in at least one layer of fixing material for making a bond between the insert and the elastomer, said material being based on rubber; and molding the elastomer onto the insert; wherein the cleaning step is performed dry and comprises laser treatment which consists in scanning the fixing surface with a laser beam of sufficient power to eliminate the impurities present on said fixing surface.

2. A method according to claim 1, in which during the cleaning step, the laser beam delivers energy to the fixing surface at a mean density per unit area lying in the range 0.5 J/cm$^2$ to 20 J/cm$^2$.

3. A method according to claim 1, in which a pulse laser is used.

4. A method according to claim 1, in which the fixing surface is scanned by the laser beam at a treatment speed of at least 2 cm$^2$/s.

5. A method according to claim 1, in which a laser is used selected from excimer lasers emitting in the ultraviolet and YAG lasers emitting in the infrared.

6. A method according to claim 1, in which the insert is made of steel.

7. A method according to claim 1, in which during the cleaning step the laser beam is used to deliver sufficient energy to the fixing surface of the metal insert to eliminate all traces of corrosion on said fixing surface.

8. A method according to claim 1, in which the cleaning step is followed by a passivation step.

9. A method according to claim 1, in which the cleaning step is followed directly by the coating step.

10. A method according to claim 9, in which the coating step is implemented sufficiently quickly after the cleaning step to avoid any trace of corrosion reappearing on the fixing surface.

11. A method according to claim 10, in which the coating step is implemented less than 24 hours after the end of the cleaning step.

12. A method according to claim 1, in which during the cleaning step the laser beam is used to deliver sufficient energy to the fixing surface to etch said fixing surface to a small extent.

13. A method according to claim 1, in which the elastomer is rubber.

\* \* \* \* \*

UNITED STATES PATENT AND TRADEMARK OFFICE
CERTIFICATE OF CORRECTION

PATENT NO. : 6,727,464 B2
DATED : April 27, 2004
INVENTOR(S) : André Girard et al.

It is certified that error appears in the above-identified patent and that said Letters Patent is hereby corrected as shown below:

Title page, Item [54] and Column 1, lines 1-4,
Title, please delete "METHOD OF MANUFACTURING A MOTOR VEHICLE ANTIVIBRATION DEVICE COMPRISING A METAL INSERT FOR BONDING TO ELASTOMER" and insert -- METHOD OF MANUFACTURING A MOTOR VEHICLE ANTIVIBRATION DEVICE COMPRISING A METAL INSERT FOR BONDING TO ELASTOMER FIELD OF THE INVENTION --.

Signed and Sealed this

Thirtieth Day of November, 2004

JON W. DUDAS
*Director of the United States Patent and Trademark Office*